Figure 1:
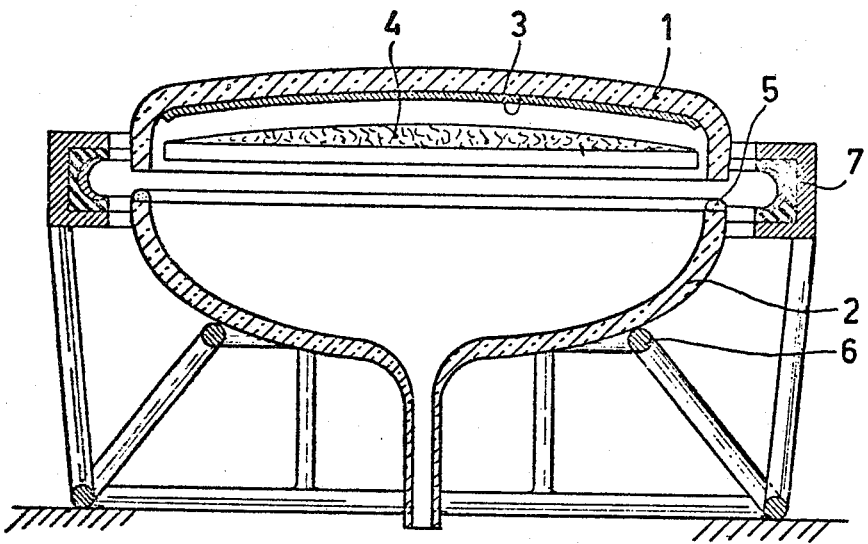

United States Patent [19]

La Grouw et al.

[11] 3,912,482

[45] Oct. 14, 1975

[54] METHOD OF PROVIDING A SEALED JOINT FOR JOINING PARTS OF A VACUUM VESSEL

[75] Inventors: Coenraad Maria La Grouw; Cornelus Wilhelmus Theresia van den Wittenboer; Hendrik Jan Hubers, all of Eindhoven, Netherlands

[73] Assignee: U.S. Philips Corporation, New York, N.Y.

[22] Filed: Mar. 9, 1973

[21] Appl. No.: 339,602

Related U.S. Application Data

[63] Continuation of Ser. No. 180,902, Sept. 15, 1972, abandoned.

[30] Foreign Application Priority Data

May 18, 1968 Netherlands .................. 6807090

[52] U.S. Cl. .................. 65/43; 29/25.11; 65/58; 65/DIG. 8; 156/89; 106/54
[51] Int. Cl.² .................................... C03C 27/10
[58] Field of Search .............. 156/89; 65/43, 42, 36, 65/155, 32, 33, DIG. 8, 58; 106/49, 53, 52, 54; 220/2.1 R, 2.1 A; 29/25.11

[56] References Cited
UNITED STATES PATENTS

| | | | |
|---|---|---|---|
| 2,517,019 | 8/1950 | Nordberg | 106/52 |
| 2,861,392 | 11/1958 | Vincent | 65/155 |
| 2,936,923 | 5/1960 | Veres | 65/43 |
| 3,113,878 | 12/1963 | Martin | 220/2.1 A |
| 3,250,631 | 5/1966 | Lusher | 106/53 |
| 3,291,586 | 12/1966 | Chapman et al. | 65/43 |
| R25,791 | 6/1965 | Claypoole | 220/2.1 A |

Primary Examiner—Charles E. Van Horn
Assistant Examiner—F. Frisenda, Jr.
Attorney, Agent, or Firm—Frank R. Trifari

[57] ABSTRACT

Parts of an evacuated glass vessel are joined by a non-crystallizing solder glass having a coefficient of thermal expansion which is higher than the surfaces to be sealed and which contains particles of glass which reduces the coefficient of thermal expansion without increasing the soldering temperature, e.g. a borosilicate, aluminosilicate or quartz glass having a thermal coefficient of expansion smaller than $40 \times 10^{-7}$.

9 Claims, 6 Drawing Figures

METHOD OF PROVIDING A SEALED JOINT FOR JOINING PARTS OF A VACUUM VESSEL

This is a continuation of application Ser. No. 180,902, filed Sept. 15, 1972, now abandoned.

The invention relates to a method of sealing adjoining parts of a vacuum vessel in a vacuum-tight manner, for example, an envelope of a cathode ray tube and particularly of a colour television picture tube, and to a solder glass for sealing adjoining parts of an evacuated vessel.

When two parts of a wall, particularly those having comparatively large dimensions, are soldered together to form a vacuum vessel by means of a solder glass the soldering temperature of which lies below the deformation temperature of the material of the surfaces to be sealed, the layer of solder glass, upon evacuation, will usually be in a state of stress, also as a result of the external air pressure on the parts of the wall of the vacuum vessel. The parts of the wall themselves, will be slightly deformed as a result of the air pressure. For readily degassing the components present in the vacuum vessel, the vacuum vessel, upon evacuation, must be heated at a temperature of approximately 400°C. During said heating, the solder glass of the seal, however, may not become soft so that the stress disappears since otherwise, when air is again admitted to the vacuum vessel, for example, for repair purposes, the seal may have an unfavourable state of stress, in which inadmissible tensile forces may be formed as the wall of the vessel tries to regain its original shape. As a result of this, the envelope usually breaks. Therefore the material of the seal, after soldering, may not show stress relaxation at the degassing temperature, which means that the stress build-up temperature after soldering must be higher than the degassing temperature to be used. The term "stress build-up temperature" is to be understood to mean the temperature at which the viscosity upon cooling the glass after heating at a higher temperature, becomes so large that stresses can be formed in the glass. Stresses present in the glass will then be maintained when the glass is heated again to near said temperature.

The soldering temperature may not be so high that glass parts of the wall of the vessel begin to deform or that components present in the vacuum vessel are damaged. The solder glass must therefore have the lowest possible soldering temperature.

A known method of satisfying the requirements with respect to the soldering temperature, and the stress build-up temperature after soldering is to use a solder glass which crystallizes during soldering as is described in British Pat. Specification No. 822,272. Although as described in the preamble of said patent specification a heating of a few minutes is sufficient to obtain crystallisation of the solder glass and although it is stated in the examples that said period must be 30 minutes at 440°C, it has been found in practice, that said period in solder glass compositions suitable for colour television picture tube envelopes must be approximately 60 minutes at 450°C. For series production this requires very long ovens with a low rate of passage. Therefore this method is expensive, since large investments in apparatus and space are required. Moreover, the envelope must be kept at the soldering temperature of 450°C during said time, which is detrimental to the temperature-sensitive components present in the envelope, and particularly for the phosphor screen of a colour picture tube.

Since a solder glass has a higher coefficient of thermal expansion according as its soldering temperature is lower, and the lowest possible soldering temperature is required, it is generally necessary to take precautions to reduce the coefficient of expansion of the solder glass. It is known from British Pat. Specification No. 904,818 that a decrease of the coefficient of thermal expansion can be obtained by adding to the solder glass an inert refractory material, for example, zirconium silicate, without the remaining properties of the solder glass being appreciably varied thereby. This addition moreover increases the mechanical rigidity of the seal. For sealing parts of vacuum vessels which afterwards have to be heated again at 400°C or higher in an oven, these additions have always been used in combination with a crystallizing basic solder glass as described in U.S. Pat. No. 3,250,631, with the above drawback of a long soldering time. Although the combination of said inert refractory addition with non-crystallizing basic solder glass also provides a useful solder glass, it has been found that such a solder glass is not suitable for use in vacuum vessels since the danger exists that the solder glass will soften again at the degasing temperature which generally is equal to or higher than the soldering temperature.

The above-mentioned drawbacks can be greatly reduced by using a method of sealing adjoining parts of a vacuum vessel in a vacuum-tight manner, for example, the envelope of a cathode-ray tube, particularly of a colour television picture tube, in which a non-crystallizing solder glass the soldering temperature of which lies below the deformation temperature of the material of the surface to be sealed and which consists of a basic solder glass having a coefficient of thermal expansion which is higher than that of the surfaces to be sealed, is intimately mixed in a comminuted state with a combinuted addition reducing the coefficient of thermal expansion, if, according to the invention, the addition consists at least substantially of glass having a coefficient of thermal expansion smaller than $40 \times 10^{-7}$.

By the addition of the glass, the stress build-up temperature of the basic solder glass after cooling of the finished seal has been found to be cnsiderably higher than that of the original basic solder glass, in contrast with the case in which the addition consists of an inert refractory material.

The addition preferably consists of aluminium silicate and borosilicate glasses having a coefficient of thermal expansion smaller than $40 \times 10^{-7}$, or quartz glass or of mixtures of the said glasses.

It has been found that the effect of the increase of the stress build-up temperature after soldering is maintained, if, in addition to one or more of the said types of glass, another inert refractory material, for example, zirconium silicate, is added so as to increase the rigidity of the seal. $Al_2O_3$ may also be used for this purpose.

The invention is based on the phenomenon that, due to the presence of the glass particles in the solder glass, not only the coefficient of thermal expansion is reduced as was to be expected without the soldering temperature increasing strongly, but that at the same time the stress build-up temperature after soldering has increased considerably. With a homogeneous solder glass, the composition of which corresponds to the original basic solder with completely dissolved addition, however, the soldering temperature would be approximately 50°C higher than that of the mixture of solder glass and addition. However, such a high soldering temperature may involve a great danger of damage to the glass parts of the wall of a vacuum vessel and to temperaturesensitive components in the vessel, for example, the phosphor screen, particularly in a colour television picture tube, even if local heating of the soldering surface is used in a manner as described in the U.S. Pat. No. 2,861,392.

The solder glass is provided on the surface to be soldered in the form of a suspension and soldering is effected preferably at such a low temperatue and for such a period of time that the solder glass forms a good sealed joint with the surfaces to be sealed without the glass particles of the addition fully dissolving in the basic solder glass; said glass particles remain present in the seal at least partly as a separate phase. temperature When using the method according to the invention, local heating generally is also highly desirable and often necessary in the case of colour television picture tubes. Although the time required for soldering is much shorter than in the known method in which the solder glass crystallizes out, local heating must be carried out at a higher temperature, also because a temperature gradient of approximately 25° to 30°C occurs between the outside and the inside of the seal. Because, however, it is not necessary to heat the entire envelope at the soldering temperature as in the method described in the British Pat. Specification No. 822,272 and soldering time is shorter, a higher soldering temperature, namely approximately 520°C, may be used in local heating without the temperature-sensitive components in the envelope becoming too hot. In order to obtain a ready melting of the basic solder glass also on the inside of the envelope, the seal will have to be maintained at the soldering temperature for approximately 10 to 20 minutes. As a result of the temperature gradient in the seal the solder glass on the inside of the seal will actually reach the soldering temperature only later.

Since the duration of the soldering operation can be comparatively short and the oven, when using local heating, is necessary only for preheating to a temperature which is lower than the actual soldering temperature and for slowly cooling, the method according to the invention is more economical than the known method in which a crystallizing solder glass is used.

Compositions of basic solder glass which are to be considered for the present method are:

| | |
|---|---|
| PbO | 70 – 85% by weight |
| $B_2O_3$ | 10 – 21% by weight |
| ZnO | 0 – 4.5% by weight |
| $Al_2O_3$ | 0 – 10% by weight |
| $SiO_2$ | 0 – 4.5% by weight |
| CoO | 0 – 0.6% by weight. |

4–16% by weight of comminuted quartz glass or another glass having a coefficient of thermal expansion below $40\times10^{-7}$ is added to comminuted basic solder glasses of the above composition to obtain the solder glass. If desired, 0–4.5% by weight of $Al_2O_3$ or another suitable metal compound, for example, zirconium silicate, may in addition be added to strengthen the seal.

It is to be noted that the U.S. Pat. Specification, No. 3,250,631 also describes an addition of quartz glass as a comparative experiment. However, this addition is used with crystallizing solder glass.

Figures 2, 3:
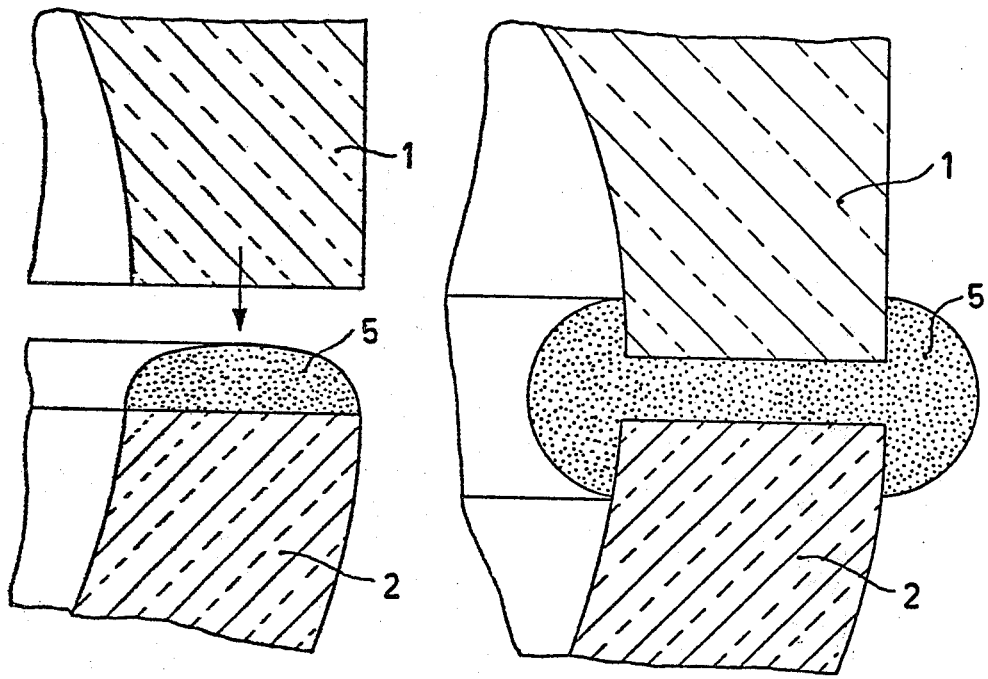
Figure 4:
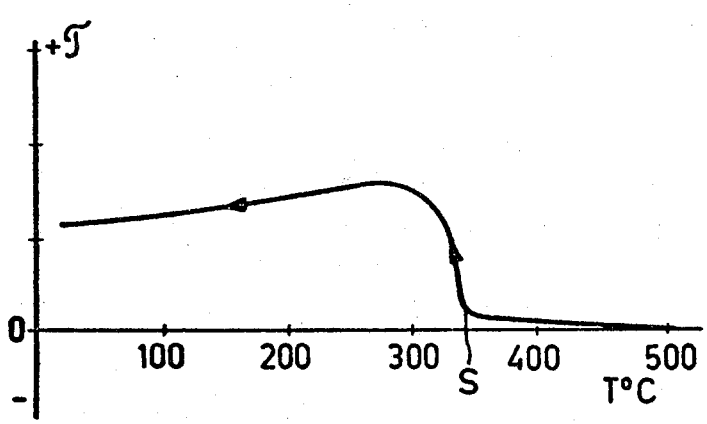
Figure 5:
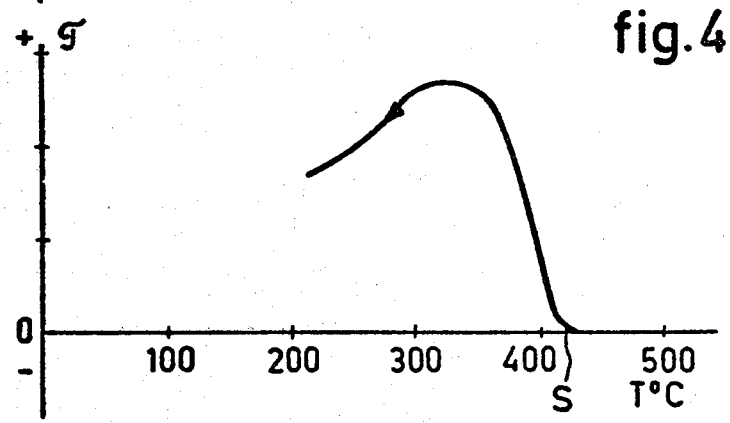
Figure 6:
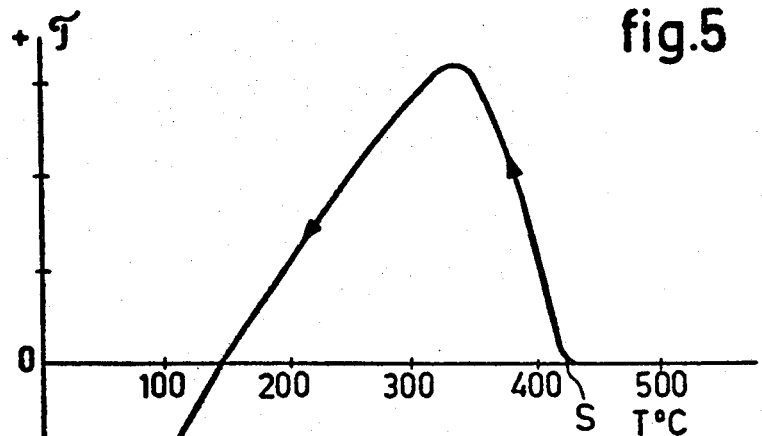

Will now be described to effect, it will now be described in greater detail, by way of with reference to the accompanying drawing, in which:

FIG. 1 diagrammatically shows an arrangement for soldering a face plate to a funnel of a colour television picture tube;

FIG. 2 is a cross-sectional view on an enlarged scale of the soldering surfaces after providing the solder glass but prior to soldering, and FIG. 3 is a cross-sectional view on an enlarged scale of the soldering seam after soldering, FIGS. 4, 5 and 6, are graphs of the stresses occurring during cooling of various compositions of solder glass after melting in which the compressive stresses in the solder glass are denoted by + and the tensile stresses in the solder glass are denoted by − on the ordinate.

In FIG. 1, the glass face plate of a colour television tube is to be soldered to a glass funnel 2. In the cup-shaped face plate 1, a phosphor layer 3 and a shadow mask 4 are provided. The funnel 2 is placed in a supporting frame 6 with the larger aperture upwards. On the edge of the funnel 2 a layer of ground solder glass mixture 5 in the form of a suspension is provided, for example, in the manner described in British Pat. Specification No. 822,272.

The face plate 1 is placed on the layer 5 after it has dried. A thermal conductor 7 is provided around the soldering surface, which conductor is preferably concave on the side facing the soldering surfaces and is provided, if desirable, with a reflector, so that the thermal energy is concentrated on the seam when the conductor is heated by one passage of current. The soldering surfaces are heated on the outside at 520°C although the solder glass 5 is already sufficiently softened for soldering at 505°C. The increased temperature is necessary in connection with the existence of the temperature gradient in the seam. Due to the higher temperature, the inside of the seam also reaches the soldering temperature. The frame 6 and the conductor 7 are placed in an oven together with the envelope 1, 2 and heated in the conventional manner at 400°C at a rate of 10°C per minute. The conductor is then heated by the passage of current to 700° to 800°C so that the seam reaches the desired temperature of 520°C. When the same is ready after 10 to 20 minutes the heating current of the conductor 7 is switched off, and the frame 6 with the envelope and the conductor 7 traverses a cooling furnace in which the envelope is cooled in the conventional manner initially at a rate of 1.5°C, then at a rate of 5°C per minute. After cooling the seam has a cross-section as is diagrammatically shown in FIG. 3. It is found that particles of the addition are still present in the seam as a separate phase.

The basic solder glass has the following composition:

| | |
|---|---|
| PbO | 78.0% by weight |
| $B_2O_3$ | 15.3% by weight, |
| $SiO_2$ | 3.5% by weight, |
| $Al_2O_3$ | 2.7% by weight and |
| CoO | 0.5% by weight. |

When said basic solder glass is provided in the molten condition as a layer on a plate consisting of a standard glass, it is found according to the polarizer method described in the above mentioned British Pat. Specification No. 822,272, page 6, lines 58 to 73, that upon cooling the basic solder glass the stress build-up temperature S = 340°C (FIG. 4). At this temperature the build-up of a compressive stress τ in the solder glass layer starts.

If the above basic glass solder, after having been sieved through a sieve having meshes of 75 μ (70 meshes per cm), 6.6 % by weight of quartz glass powder and 3.3 % by weight of $Al_2O_3$ powder, likewise having a particle size smaller than 75 μ, are added and the assembly is readily mixed to form a solder glass, it is found after melting of the solder glass that the stress build-up temperature upon cooling is approximately 415°C (FIG. 5). When this solder glass is used for the layer 5 it is found that soldering is possible at a temperature of 505°C. As a result of the temperature gradient in the seam and the desirable speed of operation, soldering begins at 520°C. After having been kept at this temperature for 15 minutes the assembly is cooled initially at a rate of 1.5°C per minute for 10 to 20 minutes, then at a rate of 5° per minute. It is found that both quartz glass particles and $Al_2O_3$ particles are present in the seam as separate components. At this temperature of 520° the components of the said addition hence do not fully dissolve in the basic solder glass. As a result of the addition of the fine glass particles it is achieved that the stress build-up temperature becomes approximately 70° to 80°C higher than that of the basic solder glass. If, however, heating were carried out previously at such a high temperature and for such a long period of time that the said addition would have fully been dissolved in the basic solder glass, a homogeneous solder glass would be obtained the soldering temperature of which would be at least 570°C and, taking into account the temperature gradient in the glass wall, would even be 590°C while the stress build-up temperature would nevertheless be only slightly higher, namely approximately 420° instead of 415°C (FIG. 6). By adding the addition which consists for the greater part of glass powder, in this case quartz glass powder, and by ensuring that it does not fully dissolve, substantially the same stress build-up temperature can be obtained as with a corresponding homogeneous solder glass in which the addition would have been dissolved. However, soldering can be carried out at a temperature which is more than 60° lower which is a great advantage for the preservation of the phosphor layer 3 and the shadow mask 4. Since the soldering operation lasts only 15 to 20 minutes a large gain in oven length and operating space is obtained, while the oven temperature when using local heating can be lower, namely 400°C instead of 450°C.

In laboratory experiments it has been found that the temperature necessary for giving the above-mentioned basic solder glass a certain flow characteristic associated with the graph of FIG. 4 is 495°C. In this case the temperature is measured at which a cylinder of compressed solder glass powder having a weight of 10 gms and a diameter of 12.7 mms (½ inch), (height approximately 2 cms), flows in a given period of time to form a disk having a diameter of 31 mms.

The same flow characteristic is obtained at 503°C for the above described solder glass — quartz glass — $Al_2O_3$ mixture to which the graph of FIG. 5 relates and at 570°C for the mixture of a basic solder glass and the above-mentioned addition, melted to a homogeneous solder glass to which FIG. 6 relates. Moreover, tensile stresses occur in this latter solder glass layer after cooling as appears also from the graph of FIG. 6.

Since in the case of the solder glass according to FIG. 5 the stress build-up temperature lies above 400°C, the envelope may afterwards be heated to 400° upon degassing without annealing of the finished seam occurring.

Another suitable example of a solder glass is obtained from a basic solder glass of the following composition:

| | |
|---|---|
| PbO | 79.4% by weight. |
| $B_2O_3$ | 15.6% by weight, |
| $SiO_2$ | 4.4% by weight; |
| CoO | 0.6% by weight. | with an addition of 11.1 % by weight of quartz glass powder having a coefficient of expansion of $4 \times 10^{-7}$. The stress build-up temperature upon cooling is approximately 425°C.

In another example a powdered basic solder glass consisting of
79.5 % by weight of PbO,
10 % by weight of $B_2O_3$,
10 % by weight of $Al_2O_3$,
0.5 % by weight of CeO,
which has a stress build-up temperature of approximately 355°C is mixed with 7% by weight of an addition consisting of glass
having a composition of 78% by weight of $SiO_2$; 5 % by weight of alkali oxides; 15 % by weight of $B_2O_3$ and 2 % by weight of $Al_2O_3$, known commercially as "Pyrex", having a coefficient of expansion of $3 \times 10^{-7}$. After soldering, it is found that the stress build-up temperature has increased to approximately 370°C. This solder glass may be used for soldering components of the wall of a vacuum vessel, in which degassing is not effected by means of an oven, but by heating of the electrodes present in the vessel by means of high-frequency currents or by the passage of current. It is known from U.S. Pat. No. 2,969,293 that the coefficient of expansion of a solder glass can be reduced by the additions of amorphous silicates. However, in this case it deals exclusively with solder glass mixtures for decorative purposes in which the articels need afterwards not he heated for evacuation purposes. Moreover, the addition is preferably 30 % by weight and more. For a solder glass an addition of more than 20 % by weight is inadmissible, however, since the solder glass in the case that a higher percentage is added, does not flow sufficiently at the admissible soldering temperature.

What is claimed is:
1. A method of sealing parts of an evacuated glass vessel comprising the steps of:
forming a mixture of a comminuted non-crystallizing solder glass having a coefficient of thermal expansion which is higher than that of the material of the surfaces of the parts to be joined and an admixed comminuted glass having a coefficient of thermal expansion less than $40 \times 10^{-7}$ to form a non-crystallizing solder glass the soldering temperature of which lies below the deformation temperature of the parts to be joined and below the temperature to which the vessel is heated during evacuation;
applying the glass mixture to the surfaces of the parts to be joined;
heating the glass mixture to a temperature, and for a sufficient time, to solder the surfaces of the parts without completely dissolving the admixed glass particles;

cooling the soldered parts to increase the stress-build-up temperature of the seal above the temperature at which the vessel is heated during evacuation whereby the solder glass of said seal will not become soft during subsequent evacuation of said vessel at an elevated temperature which is above that of the sealing temperature.

2. A method as claimed in claim 1 wherein the soldering surfaces are preheated and thereafter locally heated to the soldering temperature.

3. A method as claimed in claim 1 wherein the admixed glass is 4 – 16% of the weight of the basic solder glass.

4. A method as claimed in claim 1 wherein the admixed glass consists substantially of quartz glass.

5. A method as claimed in claim 1 wherein the admixed glass consists substantially of a borosilicate glass having a coefficient of thermal expansion of $38 \times 10^{-7}$.

6. A method as claimed in claim 1 wherein the admixed glass consists substantially of an aluminosilicate glass having a coefficient of thermal expansion of $8 \times 10^{-7}$.

7. A method as claimed in claim 1 wherein the solder glass has the following composition:
70 – 85% by weight of PbO
10 – 21% by weight of $B_2O_3$
0 – 4.5% by weight of ZnO
0 – 10% by weight of $Al_2O_3$
0 – 4.5% by weight of $SiO_2$
0 – 0.6% by weight of CoO.

8. A method as claimed in claim 7 wherein the solder glass consists of:
78% by weight of PbO
15.3% by weight of $B_2O_3$
3.5% by weight of $SiO_2$
2.7% by weight of $Al_2O_3$ and
0.5% by weight of CoO
and is admixed with
6.6% by weight of quartz glass and
3.3% by weight of $Al_2O_3$.

9. A method as claimed in claim 7 wherein the solder glass consists of:
79.5% by weight of PbO
10% by weight of $B_2O_3$
10% by weight of $Al_2O_3$ and
0.5% by weight of CoO and is admixed with 7% of the weight of the basic glass of a glass having a composition:
78% by weight of $SiO_2$
5% by weight of alkali oxides
15% by weight of $B_2O_3$ and
2% by weight of $Al_2O_3$.

* * * * *

UNITED STATES PATENT AND TRADEMARK OFFICE
CERTIFICATE OF CORRECTION

PATENT NO. : 3,912,482
DATED : October 14, 1975
INVENTOR(S) : COENRAAD MARIA LA GROUW ET AL It is certified that error appears in the above-identified patent and that said Letters Patent are hereby corrected as shown below:

Column 3, line 6, change "temperaturesensitive" to --temperature sensitive-- line 18, delete "temperature"

line 32, change "one" to --the--
line 45, change "same" to --seam--
Column 6, line 23, change "0.5% by weight of CeO," to --0.5% by weight of CoO,--.

Signed and Sealed this

Twentieth Day of July 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,912,482
DATED : October 14, 1975
INVENTOR(S) : COENRAAD MARIA LA GROUW ET AL It is certified that error appears in the above-identified patent and that said Letters Patent are hereby corrected as shown below:

On the title page, section [63], after "abandoned" insert --, which was a continuation of application Serial No. 824,174, filed May 13, 1969, now abandoned.--

Signed and Sealed this

Twenty-third Day of November 1976

[SEAL]

Attest:

RUTH C. MASON
Attesting Officer

C. MARSHALL DANN
Commissioner of Patents and Trademarks